United States Patent
Nagatomi et al.

(10) Patent No.: US 8,325,580 B2
(45) Date of Patent: Dec. 4, 2012

(54) OPTICAL PICKUP DEVICE

(75) Inventors: Kenji Nagatomi, Kaizu (JP); Shinsei Kasahara, Ota (JP); Shigeharu Shirane, Kumagaya (JP); Masayuki Yoshie, Oizumi-Machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 13/174,239

(22) Filed: Jun. 30, 2011

(65) Prior Publication Data
US 2012/0002533 A1 Jan. 5, 2012

(30) Foreign Application Priority Data
Jun. 30, 2010 (JP) ................................. 2010-148817

(51) Int. Cl.
*G11B 7/00* (2006.01)
(52) U.S. Cl. ................................. 369/112.01; 369/44.42
(58) Field of Classification Search ............. 369/112.01, 369/112.02, 112.03, 112.1, 44.41, 44.42, 369/110.03, 112.04
See application file for complete search history.

(56) References Cited

U.S. PATENT DOCUMENTS
7,706,235 B2 * 4/2010 Yim .......................... 369/112.03

FOREIGN PATENT DOCUMENTS
JP 2006-73042 A 3/2006
JP 2009-211770 A 9/2009

* cited by examiner

*Primary Examiner* — Nabil Hindi
(74) *Attorney, Agent, or Firm* — Ditthavong Mori & Steiner, P.C.

(57) ABSTRACT

A spectral element separates first laser light in such a manner that an area including only signal light as reflected first laser light is formed on a photodetector. The photodetector is provided with a first sensor group which is disposed at an irradiation position of signal light of the separated first laser light, and a second sensor group which receives zero-th order diffraction light of a main beam and two sub beams of second laser light that has been transmitted through the spectral element. The second sensor group includes a four-divided sensor which receives the main beam. The four-divided sensor is disposed in an area surrounded by the first sensor group. Zero-th order diffraction light of the first laser light that has been transmitted through the spectral element is irradiated onto the four-divided sensor.

6 Claims, 11 Drawing Sheets

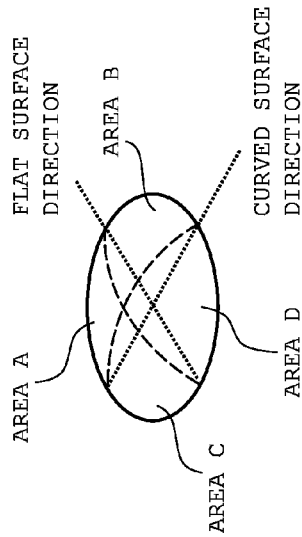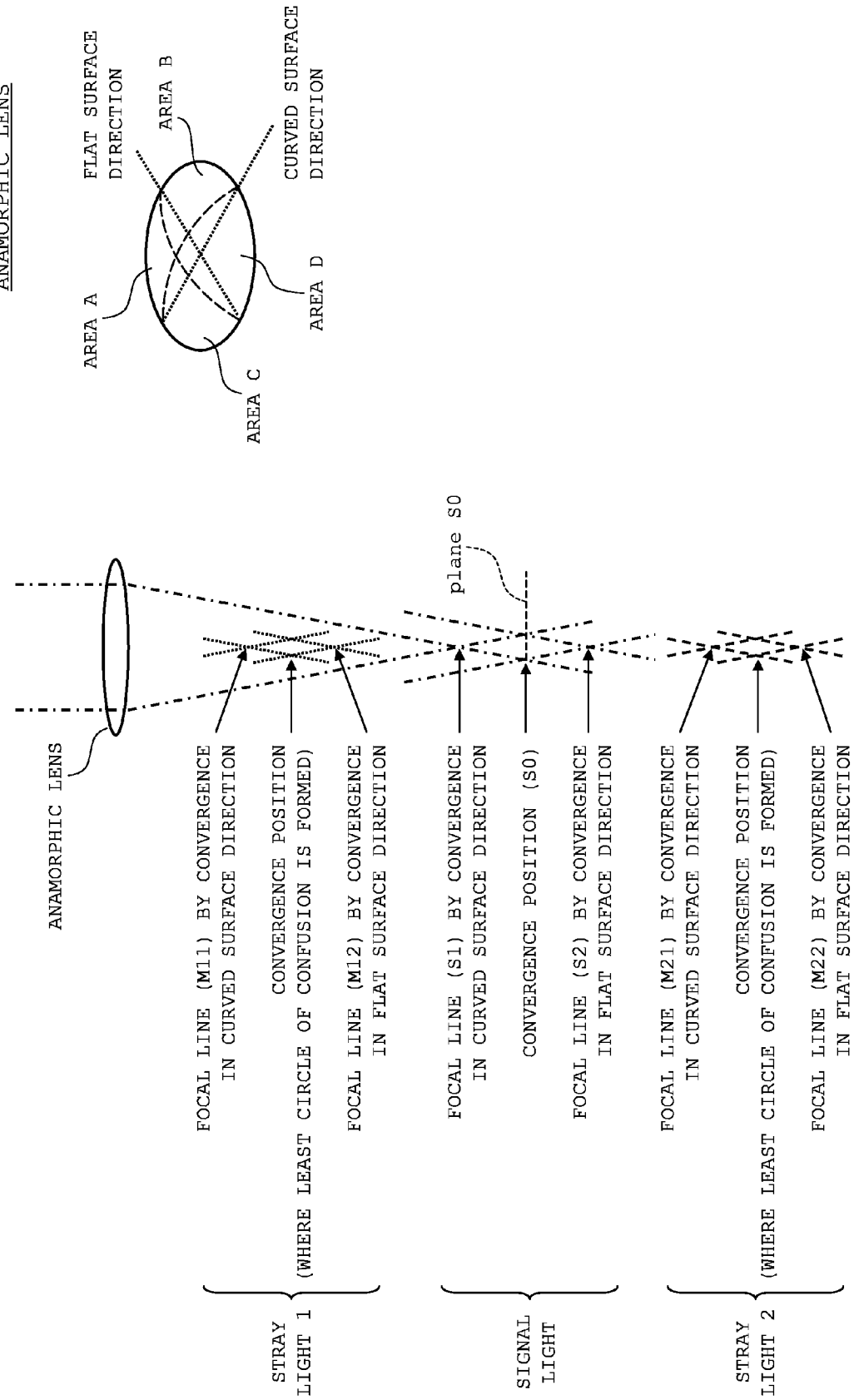

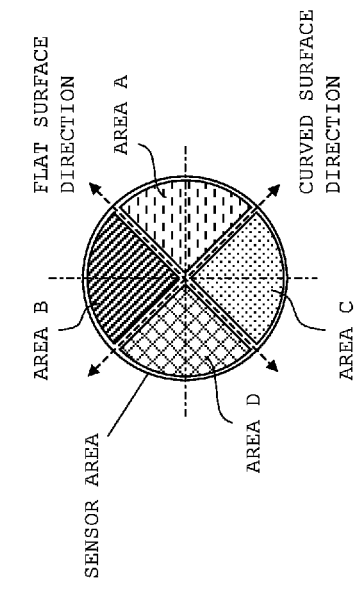
FIG.2A  LIGHT FLUX DIVIDING PATTERN
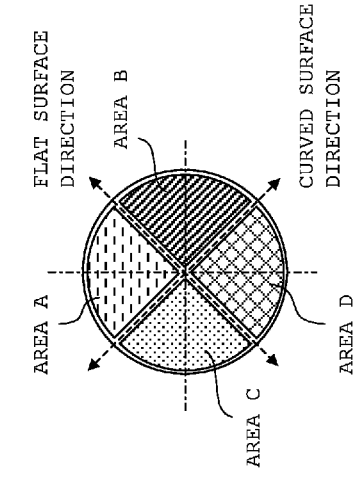
FIG.2B  SIGNAL LIGHT
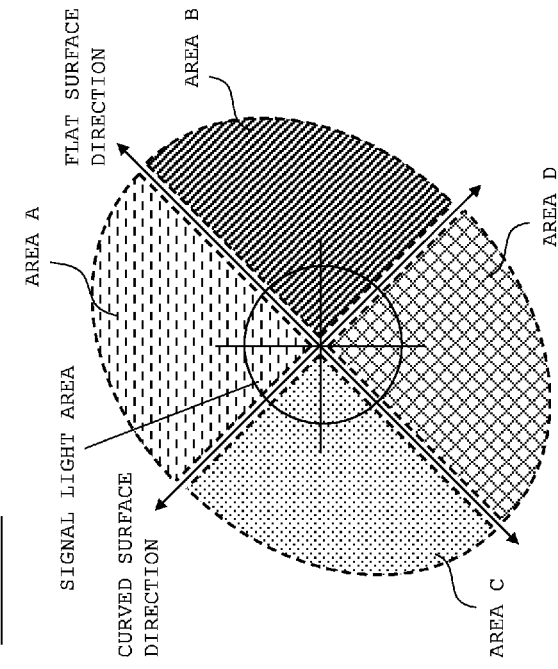
FIG.2D  STRAY LIGHT 2
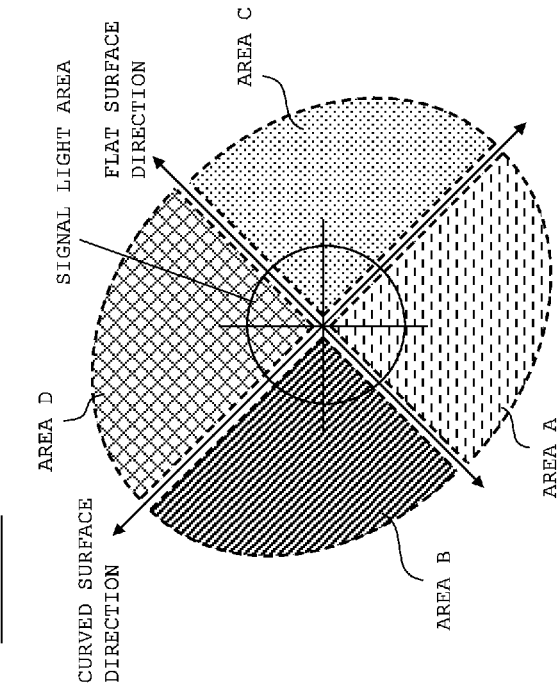
FIG.2C  STRAY LIGHT 1

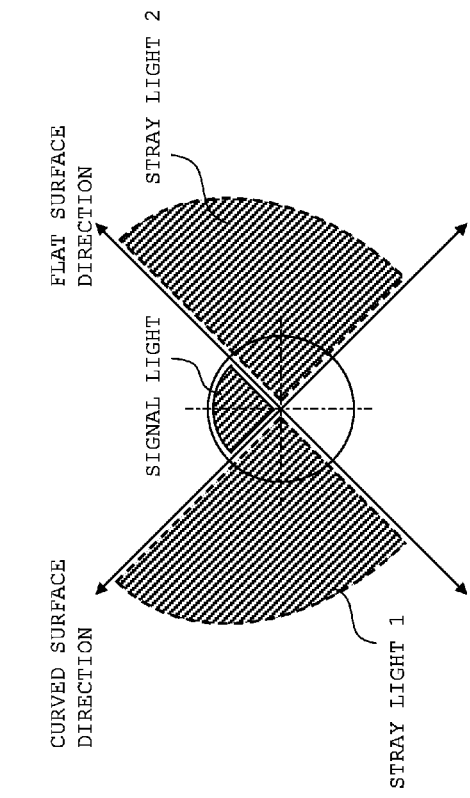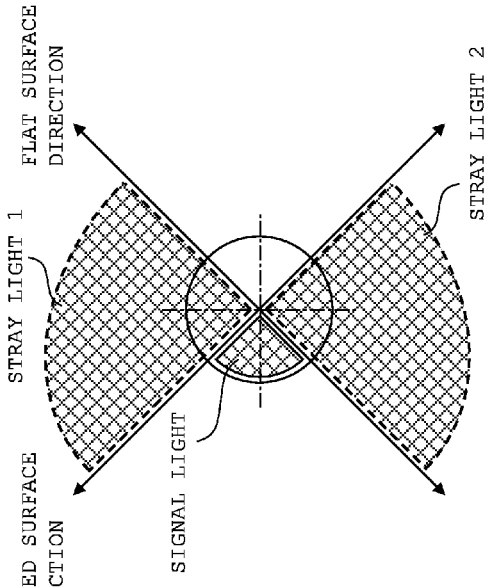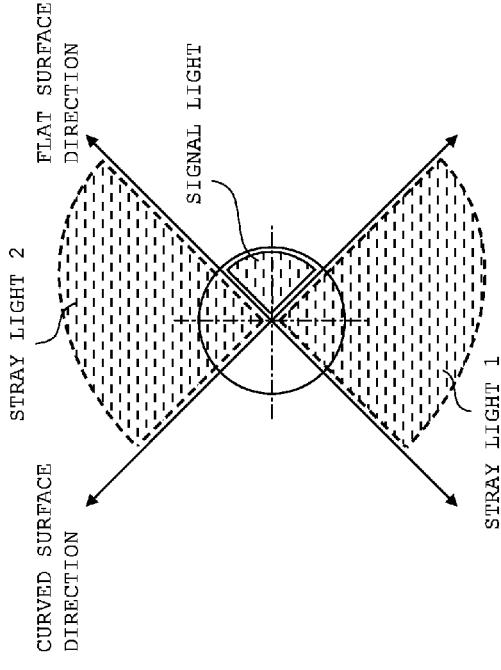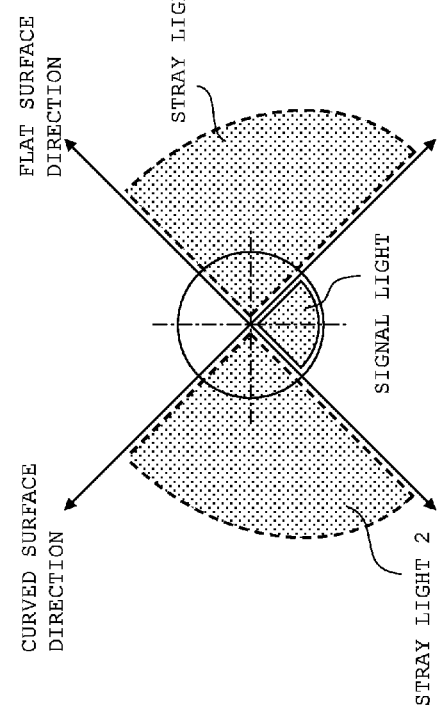
FIG. 3A  LIGHT FLUX STATE IN AREA A
FIG. 3B  LIGHT FLUX STATE IN AREA B
FIG. 3C  LIGHT FLUX STATE IN AREA C
FIG. 3D  LIGHT FLUX STATE IN AREA D

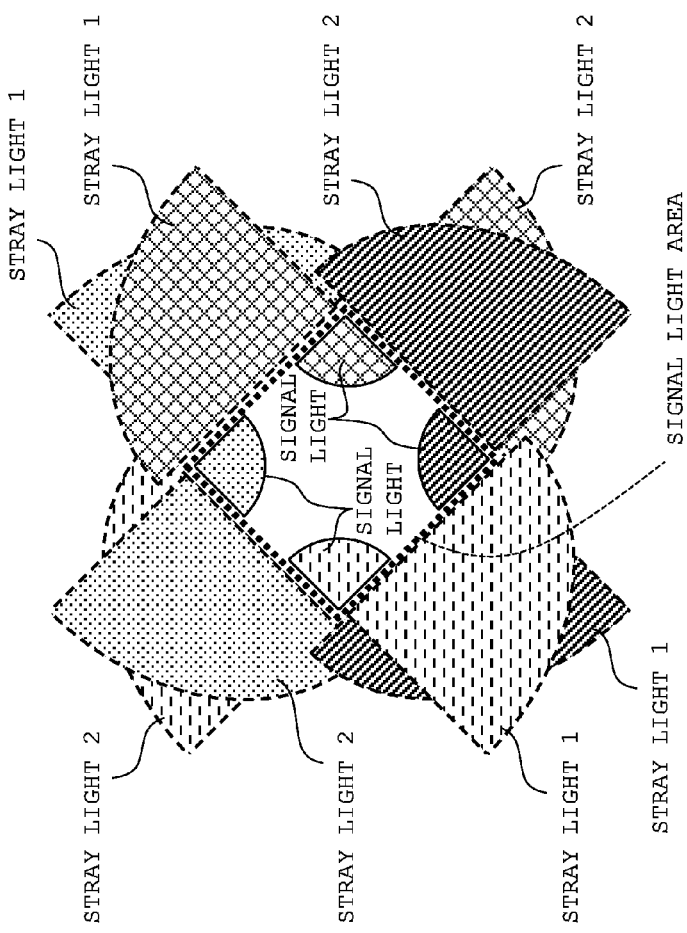
FIG. 4B LIGHT FLUX ON PLANE S0
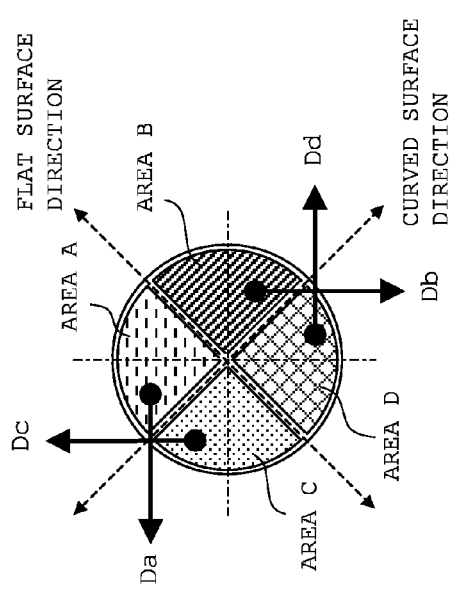
FIG. 4A PROVIDE ANGULAR CHANGE TO EACH AREA $FE = (A+B+E+F) - (C+D+G+H)$
$PP = (A+B+G+H) - (C+D+E+F)$

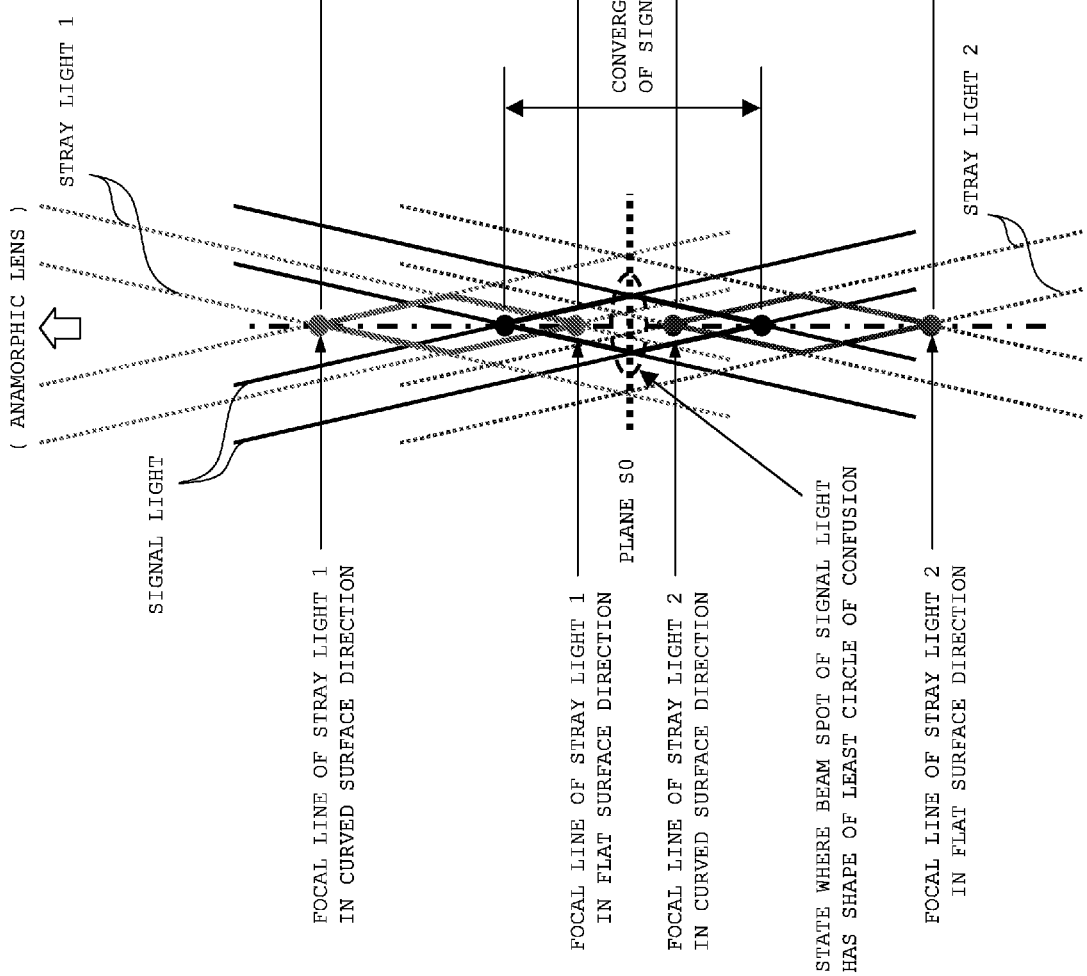

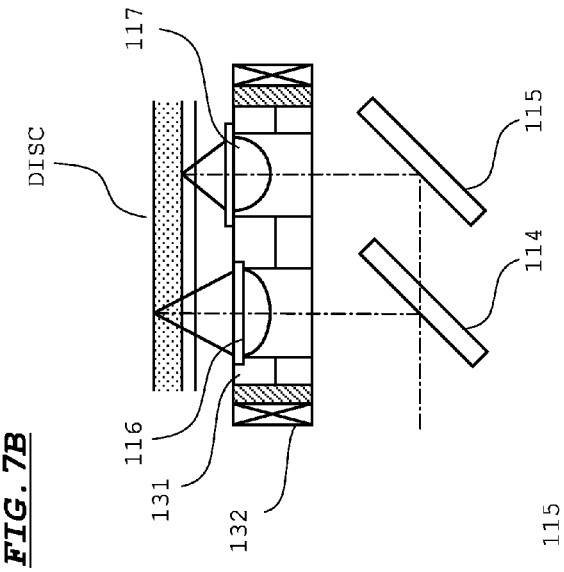
*FIG. 7A*
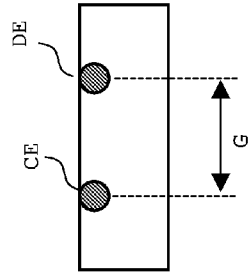
*FIG. 7B*
*FIG. 7C*

OPTICAL PICKUP DEVICE

This application claims priority under 35 U.S.C. Section 119 of Japanese Patent Application No. 2010-148817 filed Jun. 30, 2010, entitled "OPTICAL PICKUP DEVICE". The disclosure of the above applications is incorporated herein by reference.

BACKGROUND OF THE INVENTION

1. Technical Field of the Invention

The invention relates to an optical pickup device, and more particularly to a device suitable for use in irradiating a recording medium having plural laminated recording layers with laser light.

2. Disclosure of Related Art

In recent years, as the capacity of an optical disc has been increased, an optical disc having an increased number of recording layers has been developed. Laminating recording layers in a disc enables to considerably increase the data capacity of the disc. In the case where recording layers are laminated, generally, two recording layers are laminated on one side of a disc. Recently, however, laminating three or more recording layers on one side of a disc has been put into practice to further increase the capacity of the disc. Thus, the capacity of a disc can be increased by increasing the number of recording layers to be laminated. However, as the number of recording layers to be laminated is increased, the distance between the recording layers is decreased, and signal deterioration resulting from an interlayer crosstalk is increased.

As the number of recording layers to be laminated is increased, reflection light from a recording layer (a targeted recording layer) to be recorded/reproduced is reduced. As a result, if unwanted reflection light (stray light) is entered into a photodetector from a recording layer on or under the targeted recording layer, a detection signal may be deteriorated, which may adversely affect focus servo control and tracking servo control. In view of this, in the case where a large number of recording layers are laminated, it is necessary to properly remove stray light, and stabilize a signal from a photodetector.

Further, an optical pickup device is required to have compatibility with Compact Disc (CD) and Digital Versatile Disc (DVD), Blu-ray Disc (BD). Among the discs, BD has a narrower interval between recording layers than that of the other discs, and the number of recording layers included in one disc of BD is larger than that of the other discs. In view of this, particularly, there is an increasing demand for effectively eliminating an influence by stray light in BD.

On the other hand, the technology relating to the optical pickup device for CD and DVD has already been accumulated. Accordingly, it may be desirable to simplify the optical system and the sensor layout of the photodetector by applying the existing technology to CD and DVD as it is, rather than suppressing stray light.

However, it is necessary to modify the sensor layout of the photodetector, in the case where laser light for CD, laser light for DVD and laser light for BD are received by a single photodetector. In particular, in the case where an arrangement by an existing 3-beam system is applied to CD and DVD, it is necessary to efficiently arrange sensors for receiving laser light of each wavelength because the number of sensors on the photodetector is increased.

SUMMARY OF THE INVENTION

A main aspect of the invention relates to an optical pickup device. The optical pickup device according to the main aspect includes a first light source which emits first laser light; a second light source which emits second laser light of a wavelength different from a wavelength of the first laser light; a diffraction grating which separates the second laser light into a main beam and two sub beams; a combining element which aligns an optical axis of the first laser light and an optical axis of the main beam with each other; an objective lens portion which focuses the first laser light and the second laser light on corresponding discs; a single photodetector which receives the first laser light and the second laser light reflected on the respective corresponding discs; an astigmatism element which imparts astigmatism to the first laser light and the second laser light reflected on the respective corresponding discs; and a spectral element into which the first laser light and the second laser light reflected on the respective corresponding discs are entered, and which separates the first laser light by diffraction thereof. The spectral element is configured to separate the first laser light in such a manner that an area including only signal light of the first laser light reflected on a target recording layer in the corresponding disc is formed on the photodetector, and to suppress diffraction of the second laser light. The photodetector is provided with a first sensor group which is disposed at an irradiation position of the signal light of the separated first laser light, and a second sensor group which receives zero-th order diffraction light of the main beam and the two sub beams of the second laser light that has been transmitted through the spectral element without diffraction, individually. In this arrangement, the second sensor group includes a four-divided sensor which receives the main beam, and the four-divided sensor is disposed in an area surrounded by the first sensor group. Zero-th order diffraction light of the first laser light that has been transmitted through the spectral element without diffraction is irradiated onto the four-divided sensor in a state that an optical axis thereof is aligned with the optical axis of the main beam.

BRIEF DESCRIPTION OF THE DRAWINGS

These and other objects, and novel features of the present invention will become more apparent upon reading the following detailed description of the embodiment along with the accompanying drawings.

FIGS. 1A and 1B are diagrams for describing a technical principle (as to how light rays converge) in an embodiment of the invention.

FIGS. 2A through 2D are diagrams for describing the technical principle (as to how light fluxes are distributed) in the embodiment.

FIGS. 3A through 3D are diagrams for describing the technical principle (as to how signal light and stray light are distributed) in the embodiment.

FIGS. 4A and 4B are diagrams for describing the technical principle (a method for separating light fluxes) in the embodiment.

FIGS. 5A through 5D are diagrams for describing a method for arranging a sensor group in the embodiment.

FIG. 6 is a diagram showing a preferable range to which the technical principle of the embodiment is applied.

FIGS. 7A through 7C are diagrams showing an optical system of an optical pickup device in an inventive example.

Figure 5A:
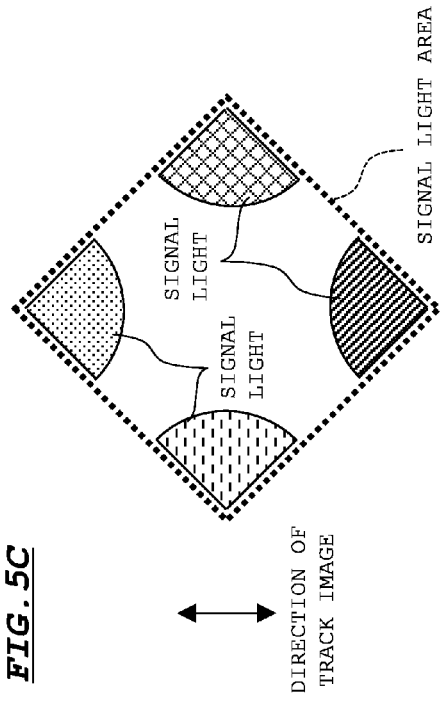

The drawings are provided mainly for describing the present invention, and do not limit the scope of the present invention.

DESCRIPTION OF PREFERRED EMBODIMENTS

In the following, an embodiment of the invention is described referring to the drawings.

Technical Principle

First, a technical principle to which the embodiment of the invention is applied is described referring to FIGS. 1A through 6.

FIG. 1A is a diagram showing a state as to how light rays are converged. FIG. 1A is a diagram showing a state as to how laser light (signal light) reflected on a target recording layer, laser light (stray light 1) reflected on a layer located at a rearward position with respect to the target recording layer, and laser light (stray light 2) reflected on a layer located at a forward position with respect to the target recording layer are converged. FIG. 1B is a diagram showing an arrangement of an anamorphic lens to be used in the technical principle.

Referring to FIG. 1B, the anamorphic lens has a function of converging laser light to be entered in a direction in parallel to the lens optical axis, in a curved surface direction and a flat surface direction. The curved surface direction and the flat surface direction intersect perpendicularly to each other. Further, the curved surface direction has a smaller radius of curvature than that of the flat surface direction, and has a greater effect of converging laser light to be entered into the anamorphic lens.

To simplify the description on the astigmatism function of the anamorphic lens, the terms "curved surface direction" and "flat surface direction" are used. Actually, however, as far as the anamorphic lens has a function of forming focal lines at different positions from each other, the shape of the anamorphic lens in the "flat surface direction" in FIG. 1B is not limited to a flat plane shape. In the case where laser light is entered into the anamorphic lens in a convergence state, the shape of the anamorphic lens in the "flat surface direction" may be a straight line shape (where the radius of curvature=∞).

Referring to FIG. 1A, signal light converged by the anamorphic lens forms focal lines at different positions from each other by convergence in the curved surface direction and in the flat surface direction. The focal line position (S1) of signal light by convergence in the curved surface direction is close to the anamorphic lens than the focal line position (S2) of signal light by convergence in the flat surface direction, and the convergence position (S0) of signal light is an intermediate position between the focal line positions (S1) and (S2) by convergence in the curved surface direction and in the flat surface direction.

Similarly to the above, the focal line position (M11) of stray light 1 converged by the anamorphic lens by convergence in the curved surface direction is close to the anamorphic lens than the focal line position (M12) of stray light 1 by convergence in the flat surface direction. The anamorphic lens is designed to make the focal line position (M12) of stray light 1 by convergence in the flat surface direction close to the anamorphic lens than the focal line position (S1) of signal light by convergence in the curved surface direction.

Similarly to the above, the focal line position (M21) of stray light 2 converged by the anamorphic lens by convergence in the curved surface direction is close to the anamorphic lens than the focal line position (M22) of stray light 2 by convergence in the flat surface direction. The anamorphic lens is designed to make the focal line position (M21) of stray light 2 by convergence in the curved surface direction away from the anamorphic lens than the focal line position (S2) of signal light by convergence in the flat surface direction.

Further, the beam spot of signal light has a shape of a least circle of confusion on the convergence position (S0) between the focal line position (S1) and the focal line position (S2).

Taking into account the above matters, the following is a description about a relationship between irradiation areas of signal light and stray light 1, 2 on the plane S0.

As shown in FIG. 2A, the anamorphic lens is divided into four areas A through D. In this case, signal light entered into the areas A through D is distributed on the plane S0, as shown in FIG. 2B. Further, stray light 1 entered into the areas A through D is distributed on the plane S0, as shown in FIG. 2C, and stray light 2 entered into the areas A through D is distributed on the plane S0, as shown in FIG. 2D.

If signal light and stray light 1, 2 on the plane S0 are extracted in each of light flux areas, the distributions of the respective light are as shown in FIGS. 3A through 3D. In this case, stray light 1 and stray light 2 in the same light flux area are not overlapped with signal light in each of the light flux areas. Accordingly, if the device is configured such that only signal light is received by a sensor, after light fluxes (signal light, stray light 1, 2) in each of the light flux areas are separated in different directions, only signal light is entered into a corresponding sensor to thereby suppress incidence of stray light. Thus, it is possible to avoid degradation of a detection signal resulting from stray light.

As described above, it is possible to extract only signal light by dispersing and separating light passing through the areas A through D from each other on the plane S0. The embodiment is made based on the above technical principle.

FIGS. 4A and 4B are diagrams showing a distribution state of signal light and stray light 1, 2 on the plane S0, in the case where the propagating directions of light fluxes (signal light, stray light 1, 2) passing through the four areas A through D shown in FIG. 2A are respectively changed in different directions by the same angle. FIG. 4A is a diagram of the anamorphic lens when viewed from the optical axis direction of the anamorphic lens (the propagating direction along which laser light is entered into the anamorphic lens), and FIG. 4B is a diagram showing a distribution state of signal light, stray light 1, 2 on the plane S0.

In FIG. 4A, the propagating directions of light fluxes (signal light, stray light 1, 2) that have passed through the areas A through D are respectively changed into directions Da, Db, Dc, Dd by the same angle amount α (not shown) with respect to the propagating directions of the respective light fluxes before incidence. The directions Da, Db, Dc, Dd each has an inclination of 45° with respect to the flat surface direction and the curved surface direction.

In this case, as shown in FIG. 4B, it is possible to distribute signal light and stray light 1, 2 in each of the light flux areas, on the plane S0, by adjusting the angle amount α with respect to the directions Da, Db, Dc, Dd. As a result of the above operation, as shown in FIG. 4B, it is possible to form a signal light area where only signal light exists on the plane S0. By disposing a sensor group of a photodetector on the signal light area, it is possible to receive only signal light in each of the light flux areas by a corresponding sensor.

Figure 5B:
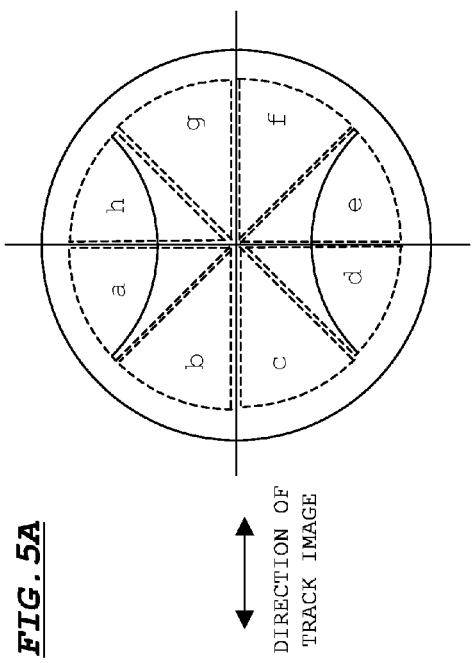

FIGS. 5A through 5D are diagrams showing a method for arranging a sensor group. FIG. 5A is a diagram showing light flux areas of reflected light (signal light) on a disc, and FIG. 5B is a diagram showing a distribution state of signal light on a photodetector, in the case where an anamorphic lens and a photodetector (a four-divided sensor) based on a conventional astigmatism method are disposed on the arranged position of the anamorphic lens and on the plane S0, in the arrangement shown in FIG. 1A. FIGS. 5C and 5D are diagrams showing a distribution state of signal light and a sensor layout based on the above principle, on the plane S0.

The direction of a diffraction image (a track image) of signal light resulting from a track groove has an inclination of 45° with respect to the flat surface direction and the curved surface direction. In FIG. 5A, assuming that the direction of a track image is aligned with leftward and rightward directions, in FIGS. 5B through 5D, the direction of a track image by signal light is aligned in upward and downward directions. In FIGS. 5A and 5B, to simplify the description, a light flux is divided into eight light flux areas a through h. Further, the track image is shown by the solid line, and the beam shape in an out-of-focus state is shown by the dotted line.

It is known that an overlapped state of a zero-th order diffraction image and a first-order diffraction image of signal light resulting from a track groove is obtained by an equation: wavelength/(track pitch×objective lens NA). As shown in FIGS. 5A, 5B, 5D, a requirement that a first-order diffraction image is formed in the four light flux areas a, b, e, h is expressed by: wavelength track pitch×objective lens NA>√2.

In the conventional astigmatism method, sensors P1 through P4 (a four-divided sensor) of a photodetector are arranged as shown in FIG. 5B. In this case, assuming that detection signal components based on light intensities in the light flux areas a through h are expressed by A through H, a focus error signal FE and a push-pull signal PP are obtained by the following equations (1) and (2).

$$FE=(A+B+E+F)-(C+D+G+H) \quad (1)$$

$$PP=(A+B+G+H)-(C+D+E+F) \quad (2)$$

On the other hand, as described above, signal light is distributed in the signal light area as shown in FIG. 5C in the distribution state shown in FIG. 4B. In this case, signal light passing through the light flux areas a through h shown in FIG. 5A is distributed as shown in FIG. 5D. Specifically, signal light passing through the light flux areas a through h in FIG. 5A are guided to the light flux areas a through h shown in FIG. 5D, on the plane S0 where the sensors of the photodetector are disposed.

Accordingly, by disposing the sensors P11 through P18 at the positions of the light flux areas a through h shown in FIG. 5D in an overlapped state as shown in FIG. 5D, it is possible to generate a focus error signal and a push-pull signal by performing the same computation as applied to the process described in the case of FIG. 5B. Specifically, assuming that A through H represent detection signals from the sensors for receiving light fluxes in the light flux areas a through h, a focus error signal FE and a push-pull signal PP can be acquired by the above equations (1) and (2) in the same manner as described in the case of FIG. 5B.

As described above, according to the above principle, it is possible to generate a focus error signal and a push-pull signal (a tracking error signal) with no or less influence of stray light by performing the same computation as applied to the process based on the conventional astigmatism method.

The effect by the above principle is obtained, as shown in FIG. 6, in the case where the focal line position of stray light 1 in the flat surface direction is close to the anamorphic lens with respect to the plane S0 (a plane where the beam spot of signal light has a shape of a least circle of confusion), and the focal line position of stray light 2 in the curved surface direction is away from the anamorphic lens with respect to the plane S0. Specifically, as far as the above relationship is satisfied, the distribution state of signal light, and stray light 1, 2 is as shown in FIG. 4B, which makes it possible to keep signal light, and stray light 1, 2 from overlapping each other on the plane S0. In other words, as far as the above relationship is satisfied, the advantage based on the above principle is obtained, even if the focal line position of stray light 1 in the flat surface direction comes closer to the plane S0 than the focal line position of signal light in the curved surface direction, or even if the focal line position of stray light 2 in the curved surface direction comes closer to the plane S0 than the focal line position of signal light in the flat surface direction.

EXAMPLE

In the following, an example based on the above principle is described. The inventive example is an example, wherein the invention is applied to an optical pickup device compatible with BD, DVD and CD. The above principle is applied only to an optical system for BD, and a focus adjusting technology by a conventional astigmatism method and a tracking adjusting technology by a 3-beam system (an in-line system) are applied to an optical system for CD and an optical system for DVD. Laser light for BD, laser light for CD and laser light for DVD in the inventive example correspond to first laser light, second laser light and third laser light in the claims, respectively.

FIGS. 7A and 7B are diagrams showing an optical system of an optical pickup device in the inventive example. FIG. 7A is a plan view of the optical system showing a state that elements of the optical system on the disc side with respect to rise-up mirrors 114, 115 are omitted, and FIG. 7B is a perspective side view of the optical system posterior to the rise-up mirrors 114, 115.

As shown in FIG. 7A, the optical pickup device is provided with a semiconductor laser 101, a half wave plate 102, a diverging lens 103, a dual wavelength laser 104, a diffraction grating 105, a diverging lens 106, a complex prism 107, a front monitor 108, a collimator lens 109, a driving mechanism 110, reflection mirrors 111, 112, a quarter wave plate 113, the rise-up mirrors 114, 115, a dual wavelength objective lens 116, a BD objective lens 117, a spectral element 118, an anamorphic lens 119, and a photodetector 120.

The semiconductor laser 101 emits laser light (hereinafter, called as "BD light") for BD and having a wavelength of or about 405 nm. The half wave plate 102 adjusts the polarization direction of BD light. The diverging lens 103 adjusts the focal length of BD light to shorten the distance between the semiconductor laser 101 and the complex prism 107.

The dual wavelength laser 104 accommodates, in a certain CAN, two laser elements which each emit laser light (hereinafter, called as "CD light") for CD and having a wavelength of or about 785 nm, and laser light (hereinafter, called as "DVD light") for DVD and having a wavelength of or about 660 nm.

FIG. 7C is a diagram showing an arrangement pattern of laser elements (laser light sources) in the dual wavelength laser 104. FIG. 7C is a diagram of the dual wavelength laser 104 when viewed from the beam emission side. In FIG. 7C, CE and DE respectively indicate emission points of CD light and DVD light. The gap between the emission points of CD light and DVD light is represented by the symbol G.

As will be described later, the gap G between the emission point CE of CD light and the emission point DE of DVD light is set to such a value as to properly irradiate DVD light onto a four-divided sensor for DVD light. Accommodating two light sources in one CAN as described above enables to simplify the optical system, as compared with an arrangement provided with plural CANs.

Referring back to FIG. 7A, the diffraction grating 105 separates each of CD light and DVD light into a main beam and two sub beams. The diffraction grating 105 is a two-step diffraction grating. Further, the diffraction grating 105 is integrally formed with a half wave plate. The half wave plate integrally formed with the diffraction grating 105 adjusts the polarization directions of CD light and DVD light. The diverging lens 106 adjusts the focal lengths of CD light and DVD light to shorten the distance between the dual wavelength laser 104 and the complex prism 107.

The complex prism 107 is internally formed with a dichroic surface 107a, and a Polarizing Beam Splitter (PBS) surface 107b. The dichroic surface 107a reflects BD light, and transmits CD light and DVD light. The semiconductor laser 101, the dual wavelength laser 104 and the complex prism 107 are disposed at such positions that the optical axis of BD light reflected on the dichroic surface 107a and the optical axis of CD light transmitted through the dichroic surface 107a are aligned with each other. The optical axis of DVD light transmitted through the dichroic surface 107a is displaced from the optical axes of BD light and CD light by the gap G shown in FIG. 7C.

A part of each of BD light, CD light and DVD light is reflected on the PBS surface 107b, and a main part thereof is transmitted through the PBS surface 107b. As described above, the half wave plate 102, and the diffraction grating 105 (and the half wave plate integrally formed with the diffraction grating 105) are disposed at such positions that a part of each of BD light, CD light and DVD light is reflected on the PBS surface 107b.

When the diffraction grating 105 is disposed at the position as described above, a main beam and two sub beams of CD light, and a main beam and two sub beams of DVD light are respectively aligned along the tracks of CD and DVD, and the main beam and the two sub beams reflected on CD are irradiated onto a sensor group for CD, and the main beam and two sub beams reflected on DVD are irradiated onto a sensor group for DVD shown in FIG. 9A, as will be described later. In other words, by disposing the diffraction grating 105 at such a position that a main beam and two sub beams of CD light, and a main beam and two sub beams of DVD light are properly irradiated onto a sensor group for CD, and onto a sensor group for DVD shown in FIG. 9A, the polarization directions of CD light and DVD light are adjusted so that CD light and DVD light are reflected on the PBS surface 107b with a predetermined ratio.

Referring back to FIG. 7A, BD light, CD light, DVD light reflected on the PBS surface 107b is irradiated onto the front monitor 108. The front monitor 108 outputs a signal in accordance with a received light amount. The signal from the front monitor 108 is used for emission power control of the semiconductor laser 101 and the dual wavelength laser 104.

The collimator lens 109 converts BD light, CD light and DVD light entered from the side of the complex prism 107 into parallel light. The driving mechanism 110 moves the collimator lens 109 in the optical axis direction in accordance with a control signal for aberration correction. The driving mechanism 110 is provided with a holder 110a for holding the collimator lens 109, and a gear 110b for feeding the holder 110a in the optical axis direction of the collimator lens 109. The gear 110b is interconnected to a driving shaft of a motor 110c.

BD light, CD light and DVD light collimated by the collimator lens 109 are reflected on the two reflection mirrors 111, 112, and are entered into the quarter wave plate 113. The quarter wave plate 113 converts BD light, CD light and DVD light entered from the side of the reflection mirror 112 into circularly polarized light, and converts BD light, CD light and DVD light entered from the side of the rise-up mirror 114 into a linearly polarized light whose polarization direction is orthogonal to the polarization direction upon incidence from the side of the reflection mirror 112. With this operation, light reflected on a disc is reflected on the PBS surface 107b.

The rise-up mirror 114 is a dichroic mirror. The rise-up mirror 114 transmits BD light, and reflects CD light and DVD light in a direction toward the dual wavelength objective lens 116. The rise-up mirror 115 reflects BD light in a direction toward the BD objective lens 117.

The dual wavelength objective lens 116 is configured to properly focus CD light and DVD light on CD and DVD, respectively. Further, the BD objective lens 117 is configured to properly focus BD light on BD. The dual wavelength objective lens 116 and the BD objective lens 117 are driven by an objective lens actuator 132 in a focus direction and in a tracking direction, while being held on the holder 131.

The spectral element 118 has a stepped diffraction pattern (a diffraction hologram) on an incident surface thereof. Out of BD light, CD light and DVD light entered into the spectral element 118, BD light is divided into four light fluxes, as shown in FIG. 4A, and the propagating direction of each light flux is changed by diffraction on the spectral element 118. Main parts of CD light and DVD light are transmitted through the spectral element 118 without diffraction on the spectral element 118.

The anamorphic lens 119 imparts astigmatism to BD light, CD light and DVD light entered from the side of the spectral element 118. The anamorphic lens 119 corresponds to the anamorphic lens shown in FIG. 1B. The relationship between division of light fluxes by the spectral element 118, and the flat surface direction and the curved surface direction of the anamorphic lens 119 is adjusted as shown in FIG. 4A.

BD light, CD light and DVD light transmitted through the anamorphic lens 119 are entered into the photodetector 120. The photodetector 120 has a sensor layout for receiving the each light. The sensor layout of the photodetector 120 will be described later referring to FIG. 9A.

Figure 8B:
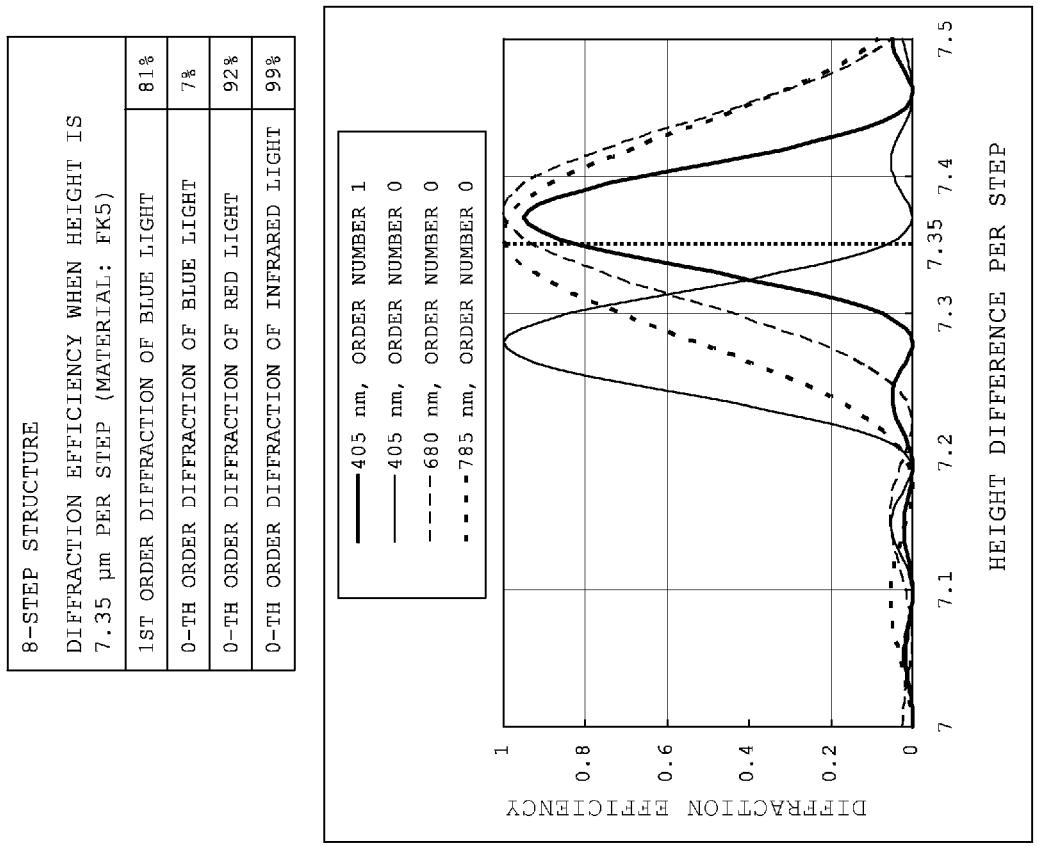
FIGS. 8A and 8B are diagrams for describing an arrangement example of a spectral element in the inventive example.
Figure 8A:
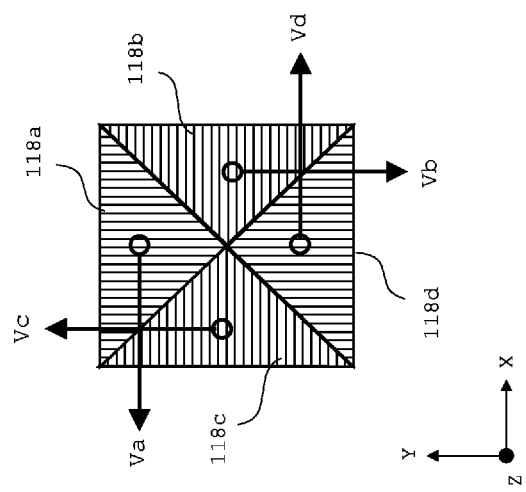

FIG. 8A is a diagram showing an arrangement of the spectral element 118. FIG. 8A is a plan view of the spectral element 118, when viewed from the side of the complex prism 107.

The spectral element 118 is made of a square transparent plate, and has a stepped diffraction pattern (a diffraction hologram) on a light incident surface thereof. As shown in FIG. 8A, the light incident surface is divided into four diffraction areas 118a through 118d. The spectral element 118 is disposed at such a position that BD light transmitted through the light flux areas A through D shown in FIG. 4A are respectively entered into the diffraction areas 118a through 118d.

The diffraction areas 118a through 118d diffract entered BD light in directions Va through Vd by plus first order diffraction. The directions Va through Vd coincide with the directions Da through Dd shown in FIG. 4A. Further, the plus first order diffraction angle with respect to BD light is the same in each of the diffraction areas 118a through 118d. The diffraction efficiencies of CD light and DVD light in the diffraction areas 118a through 118d are not zero. Accordingly, a part of each of CD light and DVD light is diffracted in the directions Va through Vd by the diffraction areas 118a through 118d.

The diffraction angle is proportional to an index obtained by multiplying a diffraction order with a wavelength. In the inventive example, the diffraction angle of BD light is diffraction order×wavelength=405 degrees, the diffraction angle of CD light is diffraction order×wavelength=785 degrees, and the diffraction angle of DVD light is diffraction order×wavelength=660 degrees. Thus, the diffraction angle of CD light is about two times of the diffraction angle of BD light, and the diffraction angle of DVD light is about 1.5 times of the diffraction angle of BD light.

By configuring the diffraction areas 118a through 118d as described above, BD light has a distribution as shown in FIG. 4B, on the light receiving surface of the photodetector 120. As shown in FIG. 4B, a signal light area of BD light with no or less incidence of stray light of BD light is formed on the light receiving surface of the photodetector 120. In the inventive example, sensors are disposed at corner portions of the signal light area of BD light. Thus, only signal light of BD light is received by the sensor group for BD.

The diffraction areas 118a through 118d are formed into e.g. a diffraction pattern having eight steps. FIG. 8B is a characteristic diagram showing a simulation result of a relationship between a height difference per step and a diffraction efficiency, in a diffraction pattern having eight steps. In this case, the height difference per step is set to 7.35 μm. With this arrangement, it is possible to set the diffraction efficiencies of zero-th order diffraction light of CD light and DVD light to 99% and 92% respectively, while keeping the diffraction efficiency of plus first order diffraction light of BD light to 81%. In this case, zero-th order diffraction efficiency of BD light is set to 7%.

Alternatively, it is possible to set the number of steps of a diffraction pattern to be formed in the diffraction areas 118a through 118d to the number other than eight. Furthermore, it is possible to configure the diffraction areas 118a through 118d by using e.g. the technology disclosed in Japanese Unexamined Patent Publication No. 2006-73042. Using the above technology enables to more finely adjust diffraction efficiencies of BD light, CD light and DVD light.

Figure 9B:
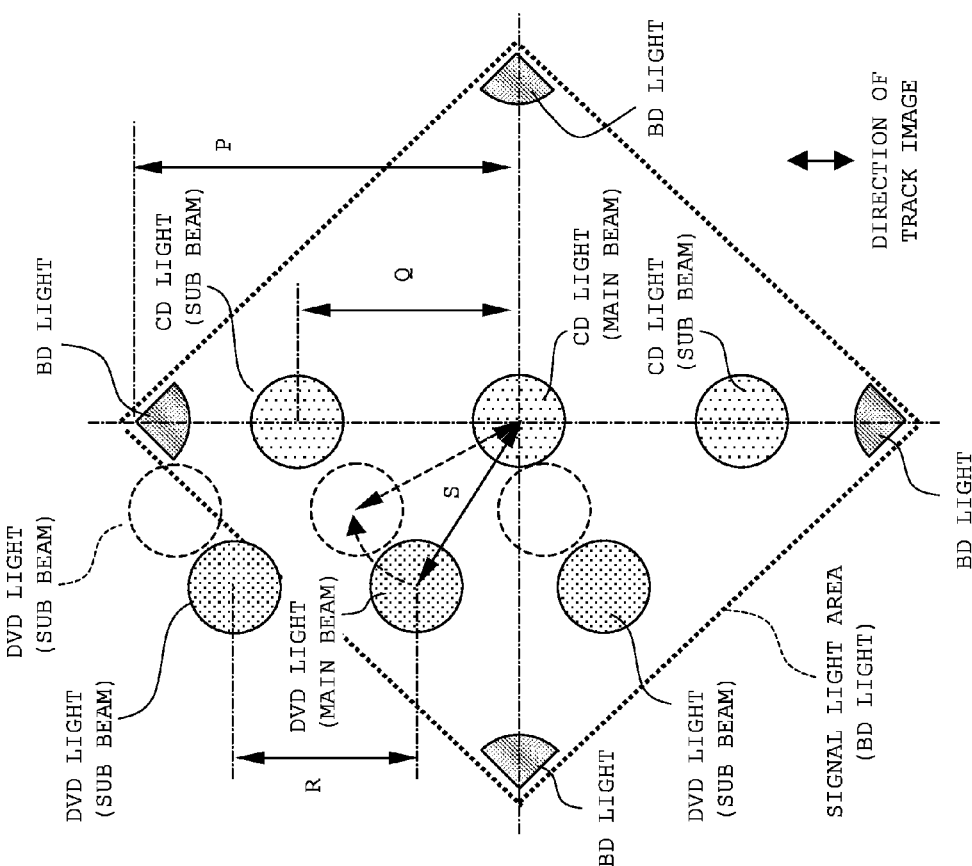
FIGS. 9A and 9B are diagrams showing a sensor layout of a photodetector in the inventive example.
Figure 9A:
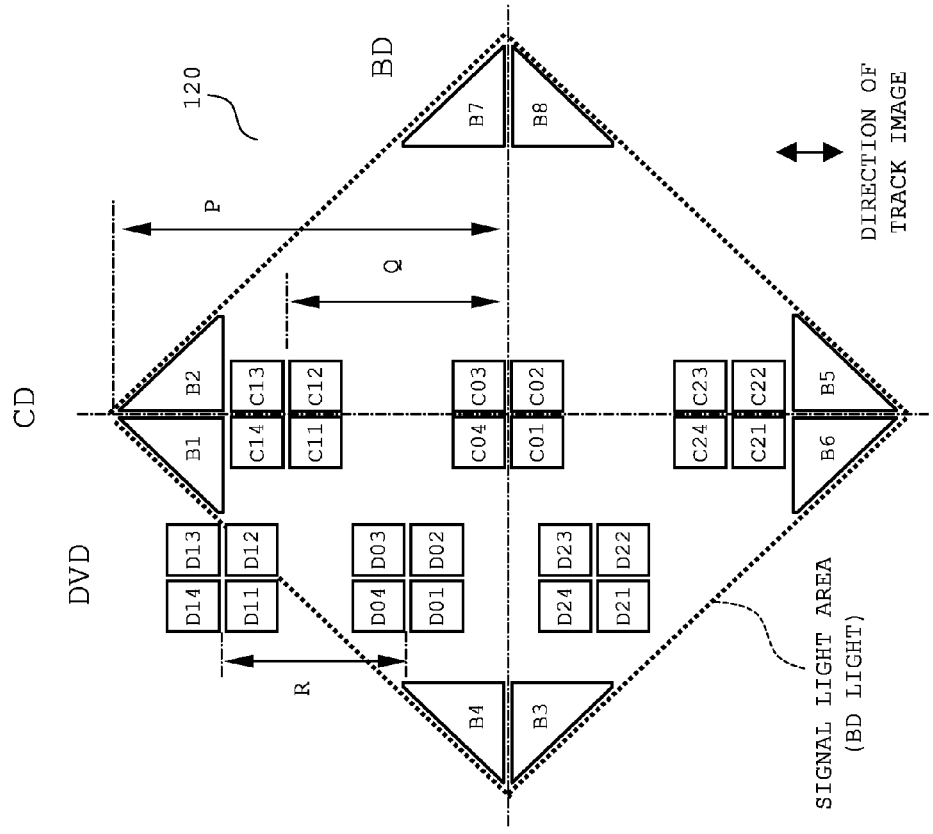

FIG. 9A shows a sensor layout of the photodetector 120. FIG. 9B is a diagram showing an irradiation state of BD light, CD light, DVD light on the light receiving surface of the photodetector 120.

The photodetector 120 has sensors B1 through B8 for BD and for receiving BD light separated by the spectral element 118; four-divided sensors each constituted of sensors C01 to C04, sensors C11 to C14, sensors C21 to C24 for CD and for receiving CD light transmitted through the spectral element 118 without separation by the spectral element 118; and four-divided sensors each constituted of D01 to D04, D11 to D14, D21 to D24 for DVD and for receiving DVD light transmitted through the spectral element 118 without separation by the spectral element 118. These sensor groups are disposed on the plane S0 shown in FIG. 1A.

As shown in FIG. 9B, four light fluxes of BD light divided by the spectral element 118 are irradiated onto four corner portions of the square-shaped signal light area. As shown in FIG. 9A, the sensors B1, B2, the sensors B3, B4, sensors B5, B6, the sensors B7, B8 are each disposed on the four corner portions of the signal light area to receive the four light fluxes of BD light.

In the inventive example, since the optical axis of BD light and the optical axis of CD light are aligned with each other by the dichroic surface 107a as described above, as shown in FIG. 9B, a main beam (zero-th order diffraction light) of CD light is irradiated onto a center of the signal light area of BD light, and likewise, zero-th order diffraction light of BD light is irradiated onto the center of the signal light area of BD light, on the light receiving surface of the photodetector 120. As shown in FIG. 9A, the four-divided sensor constituted of sensors C01 to C04 is disposed on the center position of the signal light area where a main beam of CD light is irradiated. Zero-th order diffraction light of BD light is also irradiated onto the four-divided sensor constituted of sensors C01 to C04. The center of a main beam of CD light is positioned at the intersection of parting lines of the four-divided sensor constituted of sensors C01 to C04.

As shown in FIG. 9B, two sub beams of CD light are aligned in the direction of a track image with respect to a main beam of CD light, on the light receiving surface of the photodetector 120. In the inventive example, a so-called in-line 3-beam system is used. As shown in FIG. 9A, the four-divided sensor constituted of sensors C11 to C14 and the four divided sensor constituted of sensors C21 to C24 are respectively disposed at the irradiation positions of the two sub beams. The centers of the two sub beams are respectively positioned at the intersection of parting lines of the four-divided sensor constituted of sensors C11 to C14, and at the intersection of parting lines of the four-divided sensor constituted of sensors C21 to C24.

As described above, in the inventive example, the optical axis of DVD light is displaced from the optical axis of CD light. Accordingly, a main beam and two sub beams of DVD light are irradiated at positions displaced from the irradiation positions of a main beam and two sub beams of CD light, on the light receiving surface of the photodetector 120. As shown in FIG. 9A, the four-divided sensors each constituted of sensors D01 to D04, sensors D11 to D14, sensors D21 to D24 are respectively disposed at irradiation positions of a main beam and two sub beams of DVD light. The centers of the main beam and the two sub beams of DVD light are respectively positioned at the intersection of parting lines of the four-divided sensor constituted of sensors D01 to D04, at the intersection of parting lines of the four-divided sensor constituted of sensors D11 to D14, and at the intersection of parting lines of the four-divided sensor constituted of sensors D21 to D24.

In the inventive example, as shown in FIG. 9A, the sensor layout of the photodetector 120 is designed in such a manner that all the sensors of the sensor group for CD, and a part of the sensors of the sensor group for DVD are included in the area surrounded by the sensor group for BD. In other words, diffraction on the diffraction grating 105 and on the spectral element 118 is adjusted in such a manner that a main beam and two sub beams of CD light, and a main beam and one sub beam of DVD light are irradiated within the signal light area of BD light; and the position of the dual wavelength laser 104 is adjusted.

Referring to FIG. 9B, the distance P from the center of the signal light area to the apex of BD light is determined by the magnitude of the diffraction angle by the diffraction areas 118a through 118d of the spectral element 118. Further, the distance Q between a main beam and a sub beam of CD light is determined by the magnitude of the diffraction angle by the diffraction grating 105.

In the inventive example, the diffraction angles of the diffraction grating 105 and the spectral element 118 are adjusted in such a manner that the distance P is set larger than the distance Q. More specifically, the diffraction angles of the diffraction grating 105 and the spectral element 118 are adjusted in such a manner that the distance P is set larger than the distance Q to such an extent that the four-divided sensors each constituted of C11 to C14, sensors C21 to C24 for receiving sub beams of CD light are not overlapped with the sensors B1, B2, B5, B6 for BD light. The diffraction angle is determined by the grating pitch of each of the diffraction grating 105 and the spectral element 118.

The distance R between a main beam and a sub beam of DVD light is determined by the magnitude of a diffraction angle by the diffraction grating 105, as well as CD light. The distance R is expressed by: R=Q×(660/785), and is set smaller than the distance Q.

The distance S between a main beam of CD light and a main beam of DVD light is determined by the gap G between the emission points of CD light and DVD light shown in FIG. 7C. Further, the positional relationship between a main beam of CD light and a main beam of DVD light on the light receiving surface of the photodetector 120 is changed by turning the dual wavelength laser 104 around the optical axis of CD light. For instance, turning the dual wavelength laser 104 around the optical axis of CD light rotatably changes the position of a main beam of DVD light with respect to a main beam of CD light, as shown by the broken line in FIG. 9B. The distance S between a main beam of DVD light, and a main beam of CD light after the rotation is kept unchanged. Further, two sub beams of CD light are aligned in the direction of a track image with respect to a main beam of CD light after the rotation. The distance R between a main beam and two sub beams of CD light after the rotation is kept unchanged.

In the inventive example, the gap G between the emission points of CD light and DVD light, and the position of the dual wavelength laser 104 are adjusted in such a manner that a main beam and one sub beam of DVD light are included in the signal light area. More specifically, the gap G between the emission points of CD light and DVD light, and the position of the dual wavelength laser 104 are adjusted in such a manner that the four-divided sensor constituted of sensors D11 to D14 or the four-divided sensor constituted of sensors D21 to D24 for receiving a sub beam of DVD light is not overlapped with the sensors B1, B2, B5, B6 for BD light.

As descried above, the sensor layout shown in FIG. 9A is designed by adjusting each part of the optical system of the optical pickup device.

In the inventive example, since the sensor layout of the photodetector 120 is designed in such a manner that all the sensors of the sensor group for CD, and a part of the sensors of the sensor group for DVD are included in the area surrounded by the sensor group for BD, as shown in FIG. 9A, it is possible to make the sensor layout compact, thereby miniaturizing the photodetector 120.

Further, in the inventive example, since zero-th order diffraction light of BD light is received by the four-divided sensor constituted of sensors C01 to C04 for CD, it is possible to adjust the position of the optical system by using output signals from the four-divided sensor constituted of sensors C01 to C04 when BD light is emitted. For instance, focus servo control for the BD objective lens 117 is performed, while emitting BD light, and the position of the photodetector 120 is adjusted in such a manner that zero-th order diffraction light of BD light is uniformly irradiated onto the sensors C01 to C04 of the four-divided sensor. Thereafter, the position of the spectral element 118 is adjusted in such a manner that plus first-th order diffraction light of BD light is uniformly irradiated onto the sensors B1 through B8 for BD. Then, after the position adjustments of the photodetector 120 and the spectral element 118 are completed, CD light is emitted, and the position of the dual wavelength laser 104 in a direction perpendicular to the optical axis of CD light is adjusted in such a manner that a main beam of CD light is uniformly irradiated onto the sensors C01 and C02 of the four-divided sensor for CD. Thus, in the embodiment of the invention, it is possible to adjust the optical system by using output signals from the sensors C01 to C04 of the four-divided sensor when BD light is emitted.

Further, in the inventive example, since the signal light area has a square shape, the sensor layout can be made compact.

Furthermore, in the inventive example, stray light removing means based on the above principle is used for the optical system for BD light, which is likely to be affected by stray light because of a small pitch between layers and a large number of layers. Thus, it is possible to satisfactorily perform a recording/reproducing operation for BD having a large number of recording layers.

The example of the invention has been described as above. The invention is not limited to the foregoing example, and the example of the invention may be modified in various ways other than the above.

Figure 10:
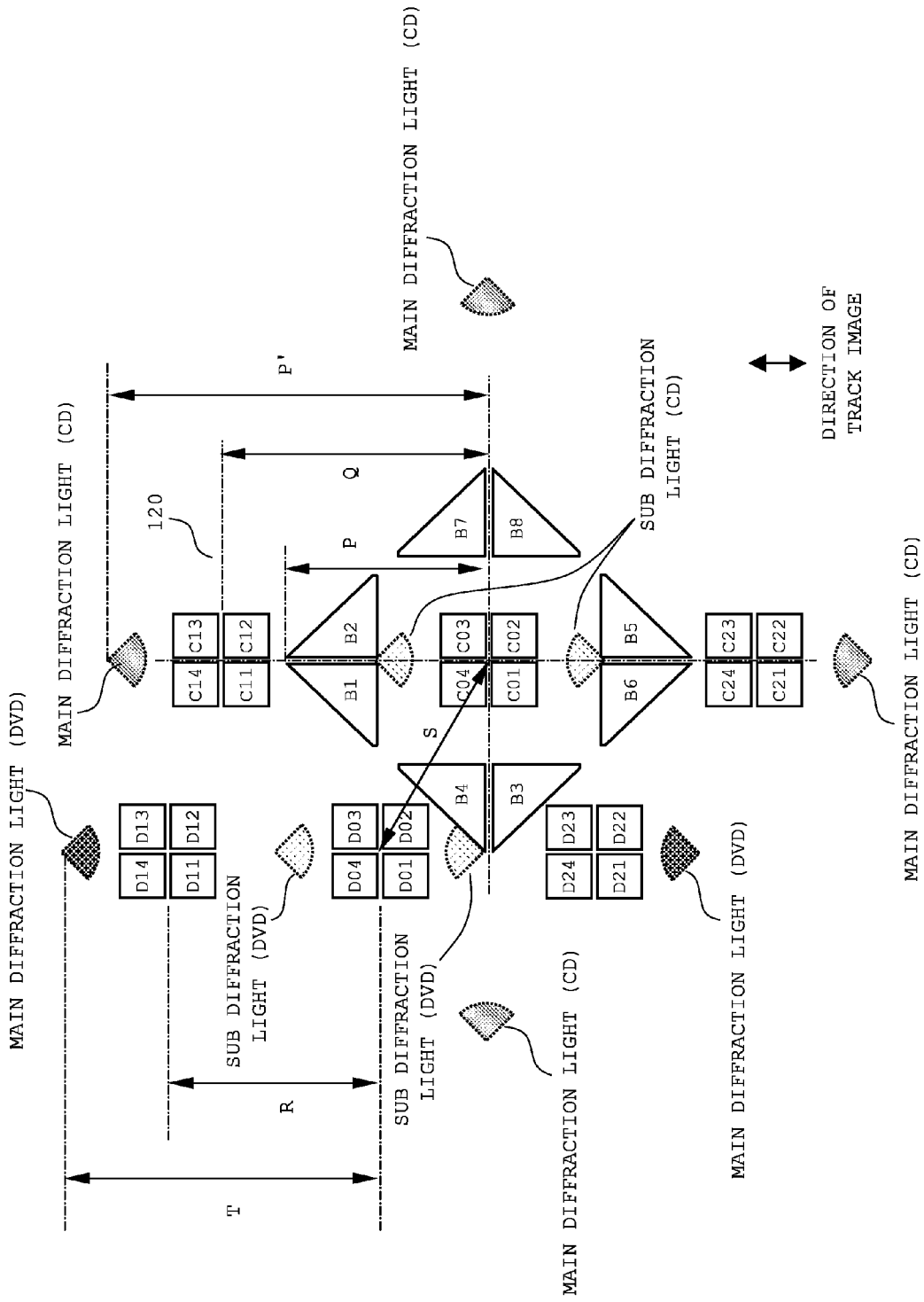
FIG. 10 is a diagram showing a sensor layout of a photodetector in a modification example.

For instance, it is possible to modify the sensor layout shown in FIG. 9A in the above example, as shown in FIG. 10. In the modification example, only the four-divided sensor constituted of sensors C01 through C04 for receiving a main beam of CD light is included in the area surrounded by the sensors B1 through B8 for BD. In the modification example, the distance P shown in FIG. 9B is set smaller than the distance Q. As a result, the diffraction angle of the spectral element 118 is set smaller than that in the above example, and the diffraction angle of the diffraction grating 105 is set larger than that in the above example. The modification example is advantageous in integrating sensor groups, as compared with the arrangement shown in FIG. 9A.

In the modification example, however, since the diffraction angle of the spectral element 118 is small, plus first order diffraction light (main diffraction light) of main beams of CD light and DVD light which are not necessary for signal generation is respectively irradiated in the vicinity of the four-divided sensors each constituted of sensors C11 to C14, sensors C21 to C24 for receiving sub beams of CD light, and the four-divided sensors each constituted of D11 to D14, sensors D21 to D24 for receiving sub beams of DVD light, and these first order diffraction light (main diffraction light) may adversely affect light receiving signals of sub beams. Since the intensity of a sub beam is significantly smaller than the intensity of a main beam, incidence of plus first order diffraction light of a main beam into a four-divided sensor for receiving a sub beam may degrade a light receiving signal of a sub beam.

In view of the above, in the modification example, it is necessary to set the distances P, P', Q, R, T in FIG. 10 to such values that plus first order diffraction light (main diffraction light) of CD light and DVD light may not be entered into a four-divided sensor for receiving a sub beam. As described above, the distance P is determined by the diffraction angle of the spectral element 118, and the distance Q and the distance R are determined by the diffraction angle of the diffraction grating 105. The distance P' from the center of the four-divided sensor constituted of sensors C01 to C04 to first order diffraction light (main diffraction light) of a main beam of CD light is expressed by: P'=P×(785/405). Further, the distance T from the center of the four-divided sensor constituted of sensors D01 to D04 to first order diffraction light (main diffraction light) of a main beam of DVD light is expressed by: T=P×(660/405).

In the modification example, the distances P, P', Q, R, T are set to such values that plus first order diffraction light of a main beam of each of CD light and DVD light may not be entered into a four-divided sensor for receiving a sub beam and each of the sensors may not overlap each other, and the diffraction angle of each of the spectral element 118 and the diffraction grating 105 is set in accordance with the setting.

In the modification example, the distance S is extended so that the sensor group for DVD light may not overlap the sensor group for BD light. As described above, the distance S is adjusted by changing the gap G between the emission points CE and DE of CD light and DVD light in the dual wavelength laser 104.

In the modification example, it is necessary to adjust the sensor layout, taking into account plus first order diffraction light of CD light and DVD light. In contrast, in the sensor layout shown in FIG. 9A, all the sensors of the sensor group for CD are completely included in the signal light area of BD light, and almost all the sensors of the sensor group for DVD are included in the signal light area. Accordingly, it is not necessary to take into account an influence of plus first order diffraction light of CD light and DVD light. In the arrangement shown in FIG. 9A, plus first order diffraction light of CD light and DVD light is irradiated at a position significantly away from the signal light area. Accordingly, there is no likelihood that a light receiving signal of a sub beam may be degraded.

Figure 11A:
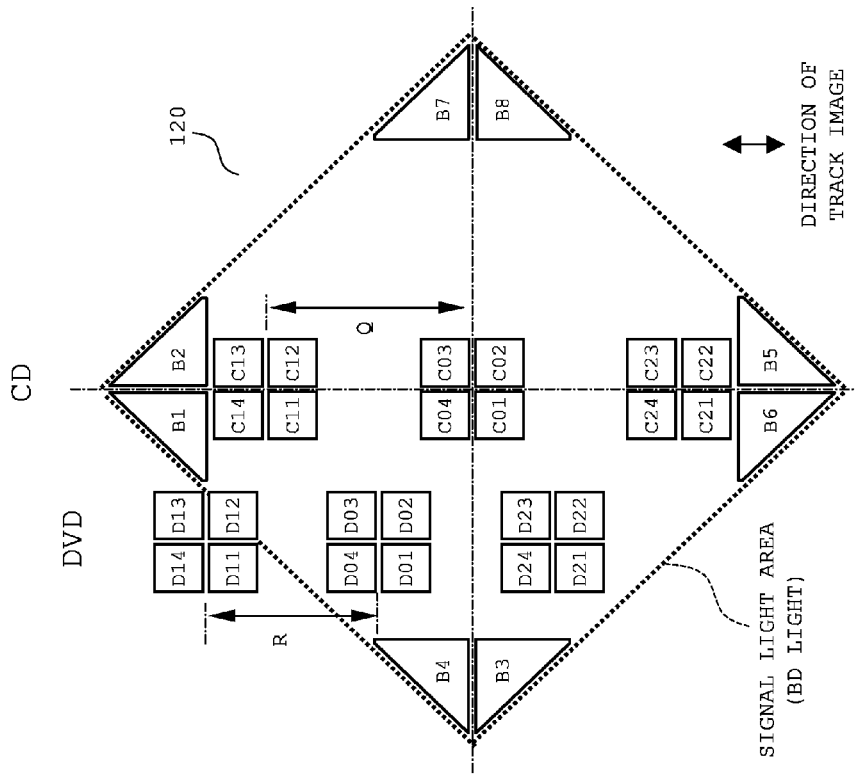
FIGS. 11A and 11B are diagrams showing a sensor layout of a photodetector in another modification example.
Figure 11B:
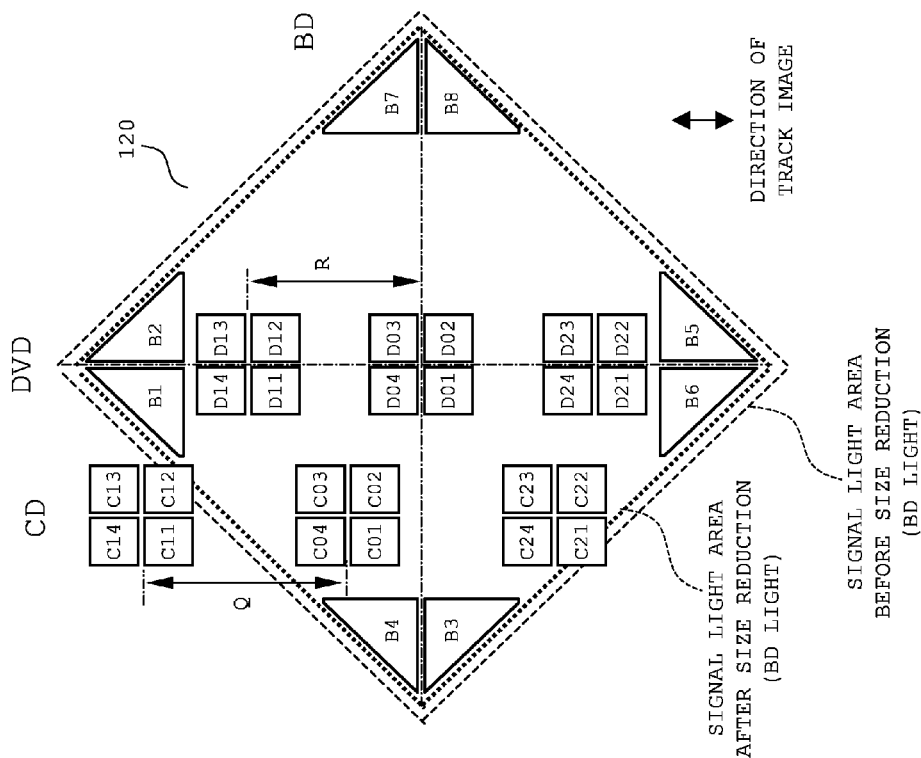

Further, in the inventive example, the optical axis of CD light is aligned with the optical axis of BD light. Alternatively, the optical axis of DVD light may be aligned with the optical axis of BD light. For instance, the positions of emission points of CD light and DVD light shown in FIG. 7C may be reversed from each other. In this case, the sensor group for CD and the sensor group for DVD are disposed as shown in FIG. 11A. In this case, since the diffraction angle of DVD light by the diffraction grating 105 is set smaller than the diffraction angle of CD light, the distance R between a main beam and a sub beam of DVD light is set smaller than the distance Q between a main beam and a sub beam of CD light on the light receiving surface. Accordingly, the arrangement shown in FIG. 11A is more advantageous in reducing the size of the signal light area of BD light, as compared with the arrangement shown in FIG. 9A, and in making the sensor layout compact. FIG. 11B is a diagram showing the sensor layout shown in FIG. 9A for comparison. In FIG. 11A, the signal light area shown in FIG. 11B is indicated by the broken line, as a signal light area before size reduction.

Further, in the inventive example, the laser light source for CD and the laser light source for DVD are accommodated in one CAN. Alternatively, a laser light source for BD, and a laser light source for CD or DVD may be accommodated in one CAN, and the optical system may be modified in accordance with the above modification. For instance, in the case where a laser light source for BD and a laser light source for DVD are accommodated in one CAN, the semiconductor laser 101 shown in FIG. 7A is substituted by a dual wavelength laser, and the dichroic surface 107a is configured to reflect BD light and CD light, and to transmit DVD light. Further, a diffraction grating which generates three beams and which acts only on CD light is additionally provided between the semiconductor laser 101 and the complex prism 107.

Furthermore, in the inventive example, the spectral element 118 is disposed anterior to the anamorphic lens 119. Alternatively, the spectral element 118 may be disposed posterior to the anamorphic lens 119, or a diffraction pattern for imparting the same diffraction function as the spectral element 118 to laser light may be integrally formed on an incident surface or an output surface of the anamorphic lens 119.

In the inventive example, there has been described an optical pickup device compatible with BD, CD, DVD. The present invention is applicable to a compatible optical pickup device using only two laser light of different wavelengths. In this case, the optical axes of the two laser light are aligned by the dichroic surface 107a in the same manner as the inventive example. Further, the photodetector 120 has a sensor layout configured by eliminating the sensor group for DVD from the sensor layout shown in FIG. 9A, FIG. 10.

Further, in the inventive example, two objective lenses are used. Alternatively, a single objective lens may be used to allow incidence of BD light, CD light, DVD light. Further, in the inventive example, an in-line system is used as a 3-beam system. Alternatively, another 3-beam system may be used, and the sensor group for receiving a sub beam may be configured to be displaced from the direction of a track image with respect to a four-divided sensor for receiving a main beam.

The embodiment of the invention may be changed or modified in various ways as necessary, as far as such changes and modifications do not depart from the scope of the claims of the invention hereinafter defined.

What is claimed is:

1. An optical pickup device, comprising:
    a first light source which emits first laser light;
    a second light source which emits second laser light of a wavelength different from a wavelength of the first laser light;
    a diffraction grating which separates the second laser light into a main beam and two sub beams;
    a combining element which aligns an optical axis of the first laser light and an optical axis of the main beam with each other;
    an objective lens portion which focuses the first laser light and the second laser light on corresponding discs;
    a single photodetector which receives the first laser light and the second laser light reflected on the respective corresponding discs;
    an astigmatism element which imparts astigmatism to the first laser light and the second laser light reflected on the respective corresponding discs; and
    a spectral element into which the first laser light and the second laser light reflected on the respective corresponding discs are entered, and which separates the first laser light by diffraction thereof, wherein
    the spectral element is configured to separate the first laser light in such a manner that an area including only signal light of the first laser light reflected on a target recording layer in the corresponding disc is formed on the photodetector, and to suppress diffraction of the second laser light,
    the photodetector is provided with a first sensor group which is disposed at an irradiation position of the signal light of the separated first laser light, and a second sensor group which receives zero-th order diffraction light of the main beam and the two sub beams of the second laser light that has been transmitted through the spectral element without diffraction, individually,
    the second sensor group includes a four-divided sensor which receives the main beam, the four-divided sensor being disposed in an area surrounded by the first sensor group, and
    zero-th order diffraction light of the first laser light that has been transmitted through the spectral element without diffraction is irradiated onto the four-divided sensor in a state that an optical axis thereof is aligned with the optical axis of the main beam.

2. The optical pickup device according to claim 1, wherein the spectral element is configured to guide the signal light of the separated first laser light to four different vertex positions of a square, on a light receiving surface of the photodetector.

3. The optical pickup device according to claim 1, wherein diffraction on the diffraction grating and on the spectral element is adjusted in such a manner that a sensor group which receives the sub beam is disposed in the area surrounded by the first sensor group.

4. The optical pickup device according to claim 1, wherein a sensor group which receives the sub beam is disposed on an outside of the area surrounded by the first sensor group, and diffraction on the diffraction grating and on the spectral element is adjusted in such a manner as to keep diffraction light of the main beam by the spectral element from entering into the sensor group which receives the sub beam.

5. The optical pickup device according to claim 1, further comprising:
a third light source which emits third laser light of a wavelength different from the wavelengths of the first laser light and the second laser light, wherein
the third light source and the second light source are disposed in one casing with a certain gap and at such positions as to align emission directions thereof with each other,
the diffraction grating separates the third laser light into a main beam and two sub beams, as well as the second laser light,
the spectral element is configured to suppress diffraction of the third laser light, as well as the second laser light, and
the photodetector is provided with a third sensor group which receives zero-th order diffraction light of the main beam and the two sub beams of the third laser light that has been transmitted through the spectral element without diffraction, individually.

6. The optical pickup device according to claim 5, wherein a position of the third light source, and diffraction on the diffraction grating and on the spectral element are adjusted in such a manner that all sensors of the second sensor group, and a part of sensors of the third sensor group are disposed in the area surrounded by the first sensor group.

* * * * *